Oct. 6, 1942.　　　　W. F. CARR　　　　2,298,107
CAMERA
Filed Dec. 7, 1939
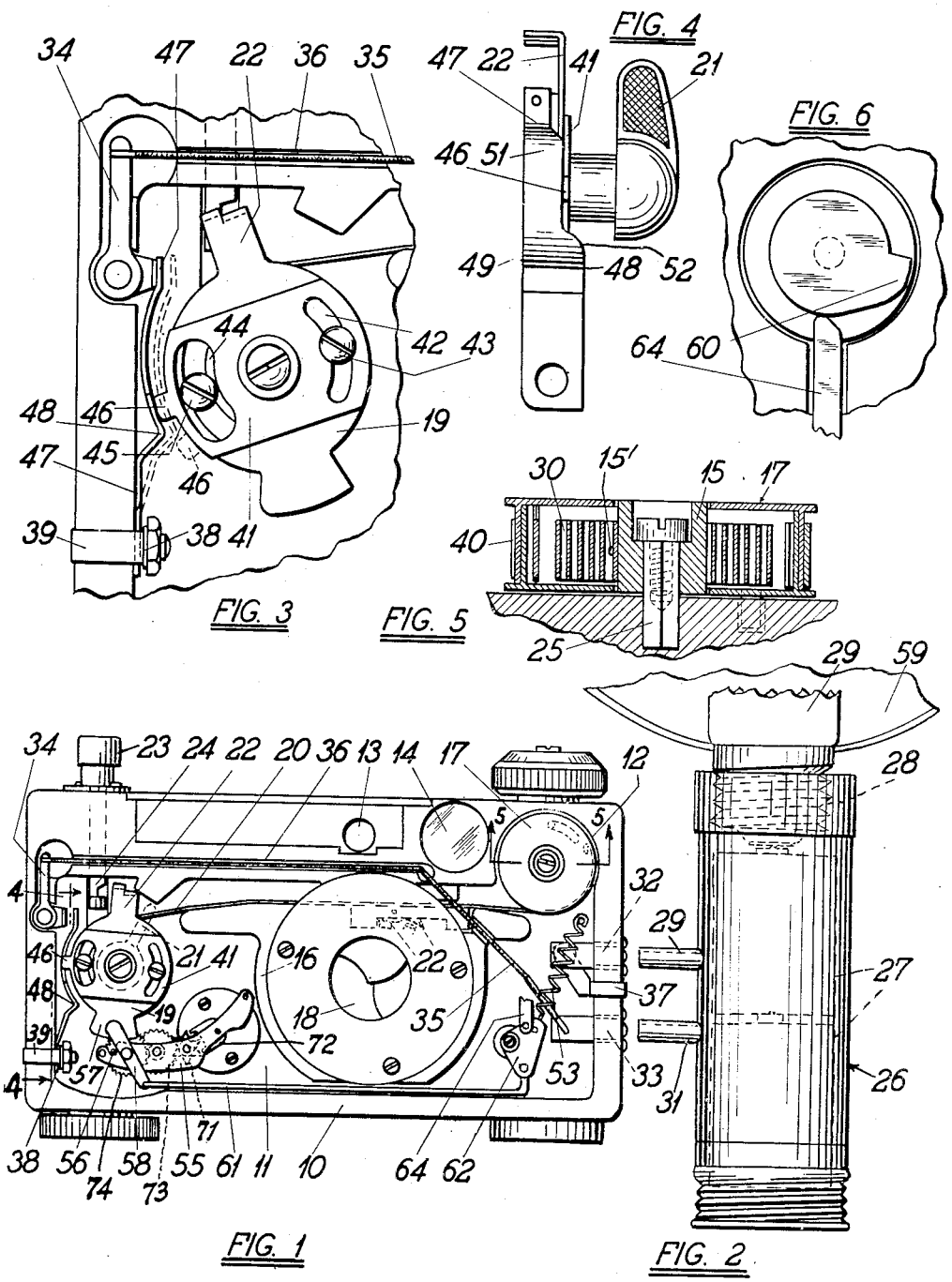
INVENTOR.
WILLIAM F. CARR
BY
ATTORNEY.

Patented Oct. 6, 1942

2,298,107

UNITED STATES PATENT OFFICE 2,298,107

CAMERA

William F. Carr, Ann Arbor, Mich., assignor to International Industries, Inc., a corporation of Michigan Application December 7, 1939, Serial No. 308,059

10 Claims. (Cl. 67—29)

This invention relates to cameras and more particularly to mechanism for operating a flash light in proper synchronism with a camera shutter.

To obtain the best results, the flash contact should be made sufficiently prior to the complete opening of the shutter to compensate for the time necessary to heat the flash filament, thus obtaining the greatest degree of light intensity when the shutter is fully open.

It is, therefore, an object of the invention to provide mechanism associated with a camera shutter whereby a flashlight circuit is completed and broken synchronously with the opening and closing movements of the shutter mechanism.

A further object is to provide a flash light switch within a camera casing and associated with the shutter actuating mechanism to properly synchronize the ignition of a flash lamp with the opening of the shutter.

Another object resides in the provision of a novel flash light switch associated with actuating means carried by the setting member of a camera.

Another object resides in the provision of means for controlling the speed at which the shutters of cameras are opened and closed.

A further object of the invention is to provide a combined camera and separable flash lamp and battery unit arranged to be susceptible of easy balance and support in the hands of the operator.

Other objects and advantages of the invention will become apparent from a reading of the following description in connection with the accompanying drawing, in which;

Fig. 1 is a front elevational view of a miniature type camera with the front cover plate and lens removed and showing an embodiment of the invention.

Fig. 2 is an elevational view of a photoflash lamp and battery unit adapted to be associated with the camera of Fig. 1.

Fig. 3 is an enlarged fragmentary elevational view of the setting member and flash contact switch mechanism.

Fig. 4 is a side view of the contact switch and setting member taken substantially on the line 4—4 of Fig. 1.

Fig. 5 is a sectional view of the shutter actuating motor mechanism taken substantially along the line 5—5 of Fig. 1, and;

Fig. 6 is a fragmentary view of the shutter speed control cam and its associated connection to a gear escapement mechanism.

Referring now to the drawing, a camera of the miniature type is shown and comprises a casing 10 which may be preferably of moldable material formed to provide an interior compartment 11 separated from the spool chambers, a circular drum chamber 12, a range finder opening 13 and view finder opening 14, a centrally disposed shutter housing 16 to receive the mechanism of a suitable blade type shutter 18 having the usual spring actuated shutter operating ring (not shown) associated therewith to be engaged by the shutter actuating mechanism.

The shutter actuating mechanism comprises generally a drum 17 adjacent one end of the casing 10 and rotatably mounted upon a bushing 15 which, in turn, is non-rotatably mounted upon a square pin 25 carried by the casing. A small flat coil spring 30 may be positioned in the drum 17 and secured at its outer end to the periphery of the drum as at 40, its inner end being connected to the bushing 15 as at 15'. Thus, by correctly positioning the bushing 15 on the square pin 25, any desired fixed tensioning of the spring 30 may be effected.

A flat carrier band 20 extends transversely across the camera casing from the drum 17 to the drum of a setting or priming member 19 having a priming lever 21 associated therewith for manual control. The flat carrier band 20 is provided with a spring pressed pawl 22 adapted to actuate the shutter operating ring to trip the shutter blades when the pawl is moved by the carrier band 20 transversely to the right in Fig. 1. Movement of the carrier band 20 to the right, in Fig. 1, under the action of the spring drum 17 will cause actuation of the shutter blades 18, and movement of the carrier band 20 to the left by manually rotating the setting member 19 counter-clockwise again tensions the drum 17 and places the mechanism in cocked position wherein the stop 22 of the setting member is automatically held against clockwise rotation by a spring pressed release pin 23 having a slot 24 therein to permit the passage of the stop thereby when the release pin is manually depressed.

Assuming the camera to be in cocked position, a manual depression of the release pin 23 against the action of its spring permits the setting member 19 to move clockwise in response to the pull of the tensioning drum 17 and the connecting transverse carrier band 20. As the tripping pawl passes the shutter operating ring, the shutters 18 are opened and automatically closed. To again cock the camera, the priming lever 21 is manually moved counter-clockwise bringing the stop 22 of the setting member to a locked position relative to the release pin 23.

For optional use with the camera thus described and shown in Fig. 1, a separable flash light unit is shown in Fig. 2 and comprises a battery casing 26 containing a pair of dry cell batteries 27, a lamp socket 28 having a photoflash lamp 29 therein provided with a reflector 59. The battery casing 26 is provided with a pair of vertically spaced contact plugs 29 and 31 to be received by similarly spaced plug jacks 32 and 33 suitably carried in an end of the camera casing.

It may be here noted that the plug jacks 32 and 33 are positioned at one end of the camera casing and the shutter release pin 23 is positioned adjacent the opposite end thereof. This arrangement is provided so that the camera may be easily used either with or without the flash light unit. With the flash light unit in coupled relation to the camera, the release pin will be positioned at the right hand of the operator leaving his left hand free to support and balance the opposite end of the camera having the battery and lamp unit thereon. Thus, the entire unit is nicely balanced and the operator's right hand is free to actuate the release pin 23 without interference.

The jack plug 33 may be electrically connected to a switch terminal 34 positoned adjacent the opposite end of the casing 10 by a conductor 35 extending diagonally upwardly to a point above the shutter unit where it may extend along a transverse groove 36 to the switch terminal. The other plug jack 32 is provided with a small ribbon of electrically conductive material and likewise a second switch terminal 38 is also provided with a similar metallic ribbon 39 overlying the edges of the casing 10. With the metallic cover plate (not shown) in position, electrical contact will be established between the plug jack 32 and the switch terminal 38.

As shown in Figs. 1, 3 and 4, a flexible and resilient switch actuating member 41 is positioned diametrically across the setting member 19 to rotate therewith and is provided adjacent one end with an arcuate slot 42 to receive the shank of a securing and adjusting screw 43 carried by the setting member 19. The switch actuating member is provided adjacent its opposite end with a wider arcuate slot 44 to permit access to an adjusting screw 45 which, in turn, provides an adjustment for the setting member 19 relative to its drum (not shown). Thus, the member 41 is secured at one end only and is sufficiently flexible to be sprung away from the setting member 19 and to again resume its normal position.

The outer end of the switch actuating member 41 is provided with a projection 46 having rounded faces thereon to engage a connecting switch element 47 for bridging the gap between the switch terminals 34 and 38.

As shown in full lines in Fig. 1 and dotted lines in Fig. 3, the switch element 47 is formed of resilient material, fixed at one end adjacent an end of the camera casing to the terminal 38 and arranged to normally remain in open position. It may be arcuately shaped from end to end and lie in and conform to the arcuate path of movement of the projection 46 on the switch actuating member 41. At one point adjacent the limit of travel of the switch actuating projection 46 in a counter-clockwise direction, the switch member 47 is bent to form a curved projection 48 to be engaged by the projection 46 during a portion of its travel for depressing the switch to closed position.

With particular reference to Fig. 4, wherein a side view of the switch element 47 is shown, it will be noted that it is of different widths, the wider portion 49 being positioned nearest the fixed end thereof and adjacent the beginning of the path of travel of the projection 46, the narrower portion 51 thereof extending from the end of the wider portion to the free end of the switch element. Along the upper edge of the switch 47, the wider portion 49 is connected with the narrower portion 51 by a rounded cam surface 52.

The parts are so arranged that when the setting member 19 is in cocked position as shown in dotted lines, Fig. 3, the projection 46 on the switch actuating member 41 is positioned in a counter-clockwise direction far enough beyond the switch projection 48 to permit the switch to assume its normal open position. Upon release of the setting member, the projection 46 with its rounded surface will strike the projection 48 of the switch element 47 forcing it outwardly to cause contact between the free end of the switch 47 and the terminal 38. As the projection rides along the inner face of the wider portion 49 of the switch element 47, the circuit to the flash bulb is closed, the filament will heat and the flash will occur, at which time the shutter operating mechanism will have been actuated to open the shutter blades at approximately the moment of the greatest light intensity. As the projection 46 passes the wider portion 49 of the switch, the narrower portion 51 thereof will pass under the projection 46 permitting the switch to open as shown in Figs. 1 and 4.

To prevent the switch 47 from being closed when the setting member is re-set to cocked position, the switch actuating member 41 is formed of flexible, resilient material and secured at one end only so that when the projection 46 reaches the wider portion 49 of the switch, it will ride up over the cam surface 52 and along the upper edge of the wider portion 49 until the projecting portion 48 is passed, whereupon the actuating member 41 and projection 46 will resiliently spring back to their normal position as shown in dotted lines, Fig. 3.

For varying and controlling the shutter speed, a gear escapement mechanism 55 is employed and comprises a series of meshing gears one of which may be provided with a small retarding spring and a pin 56 selectively engageable with a radial projection 57 on the setting member 19. The position of the pin 56 and thus the duration of the gear escapement may be controlled by a pivoted lever 58 connected at one end to a rod 61 which, in turn, may be connected to one arm of a bell crank 62 carried by the camera casing and connected to a tensioning spring 53. The other arm of the bell crank 62 may be actuated by a loosely pivoted arm 64 which, in turn, may be varied as to vertical position by means of a manually operable cam 60, shown in Fig. 6, which may overlie the drum 17 and be provided with a knob (not shown) exteriorly of the camera casing.

The escapement mechanism 55 comprises a star wheel 71 and pallet 72. This star wheel and pallet are driven by suitable gears 73 and 74, the gear 74 carrying the pin 56. The small retarding spring, not shown tends to turn the gear 74 in a clock-wise direction as shown in Fig. 1. The gear, however, is held against rotation by the pin 56 which engages the pivoted lever 58. By adjusting the lever 58 to different positions by means of the bell crank 62 and manually operable cam 60, the gear 74 is permitted to rotate in a clock-wise direction until the pin 56 abuts against the lever 58. The pin 56 thus moves up into the path of the projection 57 and is engaged by the projection 57 during the opening and closing of the shutter. The position of the pin 56 determines the duration of the engagement with the projection 57, and thus determines the amount of retarding action exerted on the setting drum 17 by the escapement mechanism 55.

Thus, the invention provides an efficient mechanism built into the camera casing for accurately synchronizing the illumination of a flash light with the opening of the shutter. The proper precision adjustment may be made by the camera manufacturers eliminating non-professional adjustment by the operator. Further, the complete arrangement and association of parts provides a small, economical, compact and nicely balanced unit for easy handling and operation.

The shutter cocking and release mechanism together with associated shutter opening and closing mechanism is disclosed and claimed in copending Serial No. 307,891 filed December 6, 1939. Broad aspects of the combined synchronizing switch and shutter cocking member are disclosed and claimed in copending Serial No. 307,892 filed December 6, 1939.

It will be obvious to those skilled in the art that various modifications may be made in construction and design without departing from the spirit or scope of the invention which is to be limited only by the appended claims.

I claim:

1. In a camera having a casing, a shutter, operating means for said shutter including an oscillatable setting member in said casing and an electric flash lamp ignition circuit, a switch in said circuit urged normally to open circuit position, said switch being provided with surfaces of different widths adjacent said setting member presenting edge surfaces of varying height with respect to said setting member, a projection rigid in its oscillatable direction and flexible in its axial direction on said setting member positioned and arranged to engage the wider of said surfaces effecting a closure of said switch as the setting member begins to move toward shutter opening position and to then pass over the edge portion of the narrower of said surfaces permitting said switch to assume its open position, whereby, when said setting member is rotated toward cocked position, said projection will ride over the edge of said wider surface leaving said switch in open circuit position.

2. In a camera having a casing, a shutter, operating means for said shutter, including an oscillatable setting member in said casing and an electric flash lamp ignition circuit, a switch in said circuit urged normally to open circuit position, said switch including a curved resilient strip having different widths throughout its length adjacent the periphery of said setting member, a projection rigid in its oscillatable direction and yieldable in its axial direction carried by the setting member and positioned to ride on the edge of said strip and over the wider portion thereof during the setting movement and to engage the wider portion of said strip to close said switch as the setting member begins to move towards shutter opening position.

3. In a camera, a casing, a normally open flash lamp ignition switch within said casing, a rockable shutter cocking member within the casing adjacent said switch, a flexible switch actuating element mounted on said cocking member, said flexible element being substantially rigid in the direction of oscillation of said cocking member and flexible in the direction of the axis of said cocking member, and cooperating engageable formations on said switch and flexible element for momentarily positively closing said switch during movement of said cocking member away from cocked position and positively causing flexure and displacement of said element to avoid closure of said switch by said element during movement of said cocking member toward cocked position.

4. In the camera defined in claim 3, said flexible switch actuating element comprising a thin plate of metal or equivalent resilient material.

5. In the camera defined in claim 3, said flexible switch actuating element being clamped to said cocking member at a fulcrum point remote from said switch.

6. In a camera, a casing, a normally open flash lamp ignition switch within said casing, a rockable shutter cocking member within the casing adjacent said switch, a flexible plate rigid in the direction of oscillation of said shutter cocking member carried by said shutter cocking member, a projection on said plate adapted to engage and momentarily close said switch during movement of said cocking member away from cocked position, and a cam formation on said switch engageable by said projection adapted to flex and displace said plate to avoid closure of said switch by said projection during movement of said cocking member toward cocked position.

7. In a camera casing, a normally open flash lamp ignition switch in said casing, a rockable member, a flat-surfaced shutter setting member angularly adjustable on said rockable member and a fastening device for holding said members in adjusted position upstanding from said setting member, a flat flexible plate rigid in the direction of oscillation of said setting member and flexible in a direction to avoid closure of said switch during shutter setting operation angularly adjustably mounted on said setting member, said plate being clamped to said setting member at a point remote from said fastening device and being apertured to accommodate and render accessible said fastening device throughout the range of said angular adjustments, and a switch contacting projection on said plate.

8. In a camera having a casing, a normally open flash lamp ignition switch within said casing having a switch blade flexible in one direction and rigid in another direction, a rockable shutter cocking member within said casing adjacent said switch, a switch actuating element rigid in the direction of oscillation of said cocking member and flexible in another direction carried by said cocking member, a projection on said switch actuating element adapted to engage said switch blade to flex the latter for momentarily closing the switch during movement of the cocking member away from cocked position, and cam means on said switch blade engageable by said projection during movement of said cocking member away from cocked position, said cam means utilizing the rigidity of said switch blade in said other direction to flex said switch actuating element and displace said projection until it is inoperative to close said switch during movement of said shutter cocking member toward cocked position.

9. In the camera defined in claim 8, said cam means being located along an edge of said switch blade in the path of said projection.

10. In a camera, a flash lamp ignition switch comprising a switch blade flexible in one direction and rigid in another direction, a rockable shutter cocking member in said casing, a switch actuating element carried by said member, said element being rigid in the direction of oscillation of said member and resilient in another direction, and said switch blade and said element being rigid in substantially normal disposed directions, and cooperating engageable formations on said switch blade and said switch actuating element for momentarily positively closing said switch during movement of said cocking member away from cocked position and positively causing flexure and displacement of said element to avoid closure of said switch by said element during movement of said cocking member toward cocked position.

WILLIAM F. CARR.